Aug. 21, 1956  R. E. KNOEDLER  2,759,526
SEAT STRUCTURE
Filed Jan. 30, 1953
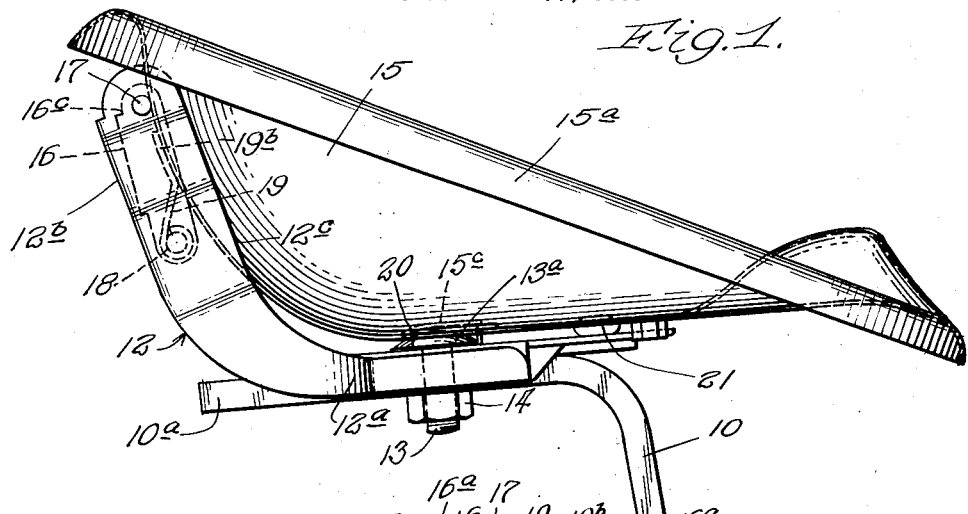
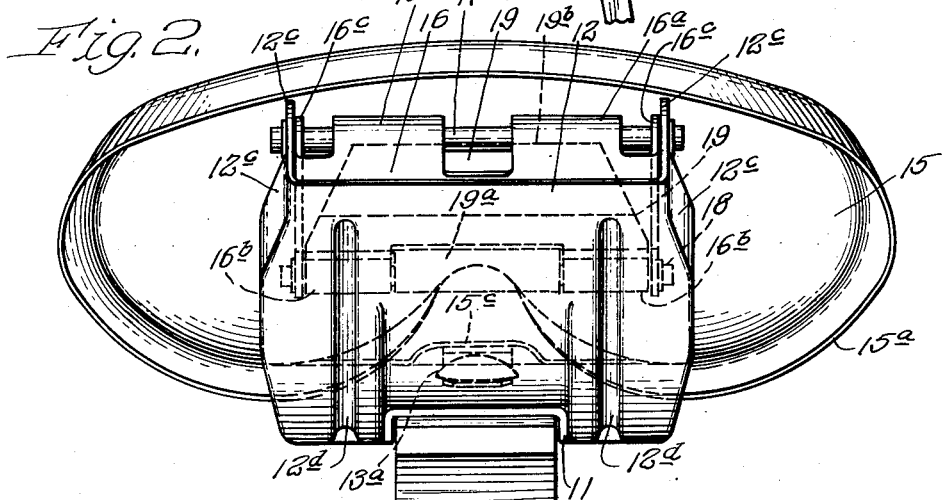
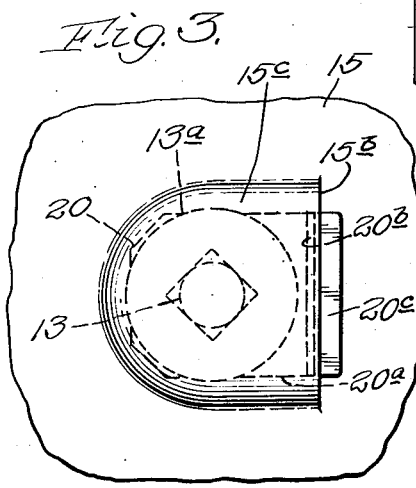
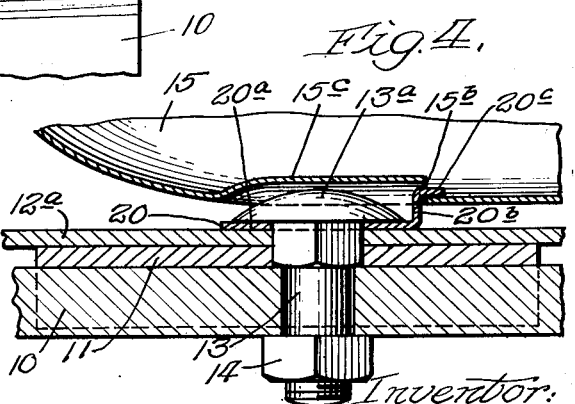
Inventor:
Roy E. Knoedler,
By Schroeder, Merriam,
Hofgren & Brady, Attys.

United States Patent Office 2,759,526
Patented Aug. 21, 1956

2,759,526

SEAT STRUCTURE

Roy Eldon Knoedler, Grand Ridge, Ill., assignor to Knoedler Manufacturers, Inc., a corporation of Illinois Application January 30, 1953, Serial No. 334,122

4 Claims. (Cl. 155—51)

This invention relates to a seat structure for a tractor and the like.

Seat structures have been proposed for use on tractors and similar installations wherein the seat is hingedly attached to its support member so that the seat may be moved rearwardly out of the way when desired to permit the operator to stand erect when he so desires. The hinge structure also permits turning the seat completely over when desired, such as when the tractor is not in use in order to keep the seat clean and dry.

In seat constructions of this nature it has been found that although the hinge arrangement provides an advantageous arrangement, there is always danger that the seat will be accidentally moved on its support. This is particularly true when the operator sometimes unthinkingly grasps the edge of the seat to pull himself on to the tractor. When this is done, the hinge arrangement sometimes permits the seat to be pulled generally rearwardly to either cause the operator to lose his grasp or to strike him on the arm or head.

In the present invention I have provided a seat structure wherein the seat is firmly held against accidental movement in a generally upward and rearward direction. The seat structure includes a support member, a seat, a linkage between the support member and the seat movably attaching the seat to the support member and a releasable catch normally locking the seat against generally upward and rearward movements. Thus the seat structure includes a restraining apparatus including a catch between the support member and seat with this apparatus normally preventing substantial movement of the seat in all direction except a generally forward direction.

The invention will be described as related to the embodiment shown in the accompanying drawings. Of the drawings:

Figure 1 is a side elevation of a seat structure embodying the invention.

Figure 2 is a rear elevation of the structure of Figure 1.

Figure 3 is a fragmentary plan view of the releasable catch.

Figure 4 is a fragmentary transverse section through the releasable catch of Figure 3.

The seat structure shown in the accompanying drawings as applied to a tractor and the like comprises a curved support bar 10 having a generally horizontal but downwardly and rearwardly inclined portion 10a, a guide plate 11 curved around the top and sides of the horizontal portion 10a and a generally concave seat support bracket 12. This support bracket has a generally horizontal but downwardly and rearwardly inclined portion 12a and an upwardly and rearwardly inclined portion 12b. The sides of the bracket 12 are provided with relatively wide flanges 12c while the rear surface of the bracket is provided with strengthening grooves 12d.

The horizontal portion 12a of the seat support bracket 12 is provided with an upwardly extending recess providing space for the guide plate 11. The entire assembly of support bar 10, guide plate 11 and seat support bracket 12 is removably fastened together by means of a threaded bolt 13 extending through this assembly with the rounded head 13a of the bolt being above the horizontal portion 12a of the bracket 12 and the lower end of the bolt being provided with a nut 14.

Movably mounted on the seat support bracket 12 is an ordinary sheet metal seat 15 provided with an outwardly and downwardly turned edge 15a. This seat is movably mounted on the support bracket 12 by means of a hinge construction which, in the embodiment shown, includes a toggle joint. In the embodiment shown in the drawings, this toggle joint comprises a hinge plate 16 having circularly bent top portions 16a rotatably supported on an upper hinge pin 17. This hinge pin and the portions 16a are normally generally horizontal, as illustrated in the drawings. The lower edge of the hinge plate 16 is provided with similar circularly bent bottom portions 16b similarly rotatably embracing a lower hinge pin 18. The hinge pins 17 and 18 are substantially parallel to each other.

The upper hinge pin 17 has its ends held in the upper ends of the seat support bracket side flanges 12c. The hinge plate 16 is held against substantial sideways movement by means of side flanges 16c positioned adjacent to the inside surfaces of the bracket flanges 12c.

In order to complete the toggle joint the lower hinge pin 18 has rotatably attached thereto the lower edge of an attaching plate 19. This lower edge of the attaching plate 19 is provided with a circularly bent bottom portion 19a rotatably embracing the lower hinge pin 19 and positioned between the bottom portions 16b of the hinge plate 16. The upper end portion 19b of the attaching plate 19 is attached to the upper rear surface of the seat 15, as shown most clearly in Figure 1.

With the above described movable connection of the seat to its support, the seat may be moved first forwardly and then the rear portion moved upwardly and rearwardly so as to permit the operator of the tractor or the like to stand erect without interference from the seat. In this arrangement the hinge plate 16 is rotated around the hinge pins 17 and 18 to extend generally upwardly in a direction opposite to that shown in the drawings. Similarly, the attaching plate 19 will extend generally upwardly with the plates 16 and 19 being essentially aligned. The seat 15 will then approach the vertical with the rear edge of the seat raised a substantial distance above its normal position and the front edge of the seat resting adjacent to the bolt 13.

With the above arrangement the seat 15 may also be turned completely over in a counterclockwise direction from the position shown in Figure 1 so that the seat is completely behind the support bracket 12 and is inverted. In this position, which protects the top surface of the seat from dirt, rain and the like, both plates 16 and 19 will extend generally upwardly and rearwardly and the seat will extend rearwardly from the bracket 12.

In order to prevent the seat 15 being accidentally turned around its hinge structure a catch is provided to prevent substantial movement of the seat upwardly and rearwardly except when this catch is released. This catch has been found extremely beneficial to prevent accidents that are caused by unintentional rotation of the seat on its hinge structure. As is well known, seats for tractors and the like are ordinarily mounted fairly high above the ground so that the operator will be out above the dust and dirt to the fullest extent possible. Under such conditions the operator often unthinkingly grasps the seat to pull himself on to the tractor and this is when the seat is likely to suddenly rotate up and over to cause the operator to lose his grip and fall or to strike the operator in the heads or other portions of his body.

In order to prevent the above described accidental turn of the seat this invention provides a restraining apparatus including a catch between the support member and the seat normally to prevent substantial movement of the seat in all directions except a generally forward direction. In the embodiment shown this catch comprises a thin metal plate 20 having flat base 20a held between the head 13a of the bolt 13 and the horizontal portion 12a of the seat support bracket 12. The metal plate 20 also includes an upwardly extending portion 20b at the front thereof and a forwardly extending tongue portion 20c at the upper end of the portion 20b.

The tongue portion 20c normally engages an essentially vertical opening 15b provided in the seat 15. This opening 15b is located at the front part of an upwardly arched section 15c of the seat 15 that is located above the head 13a of the bolt 13.

With the construction as above described, the seat is normally locked in position to prevent generally upward and rearward movement around the hinge pins 17 and 18. The catch is firmly held by reason of the springiness of the metal catch plate 20. The portion of the seat adjacent to the opening 15b is pressed firmly against the lower surface of the tongue portion 20c by the provision of a button 21 attached to the lower surface of the seat 15 and bearing against the upper surface of the seat support bracket 12 at a point forwardly of the catch.

As is shown most clearly in Figure 1, the hinge plate 16, which is rotatably mounted by means of the hinge pins 17 and 18, normally extends generally upwardly and rearwardly. Thus any downward pressure on the seat 15, such as by the weight of an operator resting on the seat or by any downward pull on the seat, provides a strong horizontal and rearward component of force. This force component tends to urge the seat rearwardly and thus hold the catch in firm engagement with the seat to prevent any accidental turning thereof. However, the seat is readily disengaged from the catch by merely pulling it forwardly a small distance equivalent to the effective length of the horizontal tongue portion 20c of the metal catch plate 20. Once this portion has been disengaged, the seat may then be readily turned about its hinge.

The invention including the catch has a number of important advantages. Thus, as explained above, it prevents movement of the seat in all directions except a generally forward direction to prevent accidents but yet is easily disengaged by merely moving the seat generally forwardly.

Furthermore, the weight of the rider holds the catch securely as this weight or any other downward pressure tends to force the seat rearwardly. The catch also gives greater stability and a more firm mounting to the seat as it holds the seat at an additional area.

As is illustrated in the drawings, the catch is extremely simple and inexpensively constructed yet contributes to a three point support with one point being at each of the two rear sides of the seat at the end edges of the hinge plate 16 and the third point being at the catch which is located between these two points and forwardly thereof.

One of the very important advantages of the construction of this invention is that the unlatching is almost wholly automatic as the natural tendency of the operator is to pull the seat forwardly before turning it about its hinge. As explained above, this forward movement need be of only very small extent to unlatch the seat.

Having described my invention as shown in the embodiment set out in the accompanying drawings, it is my intention that the invention be not limited by any of the details of description but rather be construed broadly within its spirit and scope as set out in the accompanying claims.

I claim:

1. A seat structure for a tractor and the like, comprising: a support means having a generally upwardly inclined portion; a seat; a toggle joint having one end rotatably attached to said inclined portion of the support means and the other end attached to the seat; and a forwardly-extending releasable catch means on the support means for normally locking the seat against generally upward and rearward movements but permitting relatively free forward movement, the toggle joint having its middle portion normally extending generally downwardly and forwardly from the inclined portion of the support means so that downward force on the seat tends to force the seat rearwardly to engage the catch means more securely.

2. A seat structure for a tractor and the like, comprising: a support means having a rear portion; a seat; a linkage between the rear portion and the seat movably attaching the seat to the support means; and a releasable catch means on the support means normally locking the seat against generally upward and rearward movements, the catch means comprising a forwardly-extending tongue connected to and offset from the support means and engaging a recess opening rearwardly in the bottom of the seat.

3. A seat structure for a tractor and the like comprising: a support means having a rear portion; a seat on support means; a toggle joint having one end attached to the seat and the other end attached to said rear portion permitting movement of the seat in generally forward, upward and rearward directions; and a releasable catch means between the support means and the seat having a forwardly-extending tongue on the support means spaced thereabove engaging a rearwardly opening recess in said seat and normally locking the seat only against said upward and rearward movement.

4. A seat structure for a tractor and the like comprising: a support means having a rear portion; a seat on said support means; a toggle joint having one end attached to the seat and the other end attached to said rear portion permitting movement of the seat in generally forward, upward and rearward directions; and a releasable catch means between the support means and the seat normally locking the seat only against said upward and rearward movement, said catch means including a tongue on one of said support means and seat removably engaging a recess on the other of said support means and seat.

References Cited in the file of this patent
UNITED STATES PATENTS

| | | |
|---|---|---|
| 2,269,968 | Baker | Jan. 13, 1942 |
| 2,411,125 | Borsheim | Nov. 12, 1946 |
| 2,563,277 | Roeder | Aug. 7, 1951 |
| 2,598,384 | Huber | May 27, 1952 |
| 2,604,927 | Bonnesen | July 29, 1952 |
| 2,692,008 | Klemm | Oct. 19, 1954 |